United States Patent
Pabon Ospina et al.

(10) Patent No.: US 12,394,983 B2
(45) Date of Patent: Aug. 19, 2025

(54) ELECTRICAL POWER SYSTEM

(71) Applicant: Fraunhofer-Gesellschaft zur Förderung der Angewandten Forschung E.V., Munich (DE)

(72) Inventors: Luis David Pabon Ospina, Kassel (DE); Thierry Van Cutsem, Liège (BE)

(73) Assignee: FRAUNHOFER-GESELLSCHAFT ZUR FÖRDERUNG DER ANGEWANDTEN FORSCHUNG E.V, Munich (DE)

( * ) Notice: Subject to any disclaimer, the term of this patent is extended or adjusted under 35 U.S.C. 154(b) by 219 days.

(21) Appl. No.: 18/007,124

(22) PCT Filed: Jul. 8, 2021

(86) PCT No.: PCT/EP2021/068968
§ 371 (c)(1),
(2) Date: Jan. 27, 2023

(87) PCT Pub. No.: WO2022/022972
PCT Pub. Date: Feb. 3, 2022

(65) Prior Publication Data
US 2023/0231383 A1   Jul. 20, 2023

(30) Foreign Application Priority Data
Jul. 31, 2020   (DE) ............ 10 2020 209 715.1

(51) Int. Cl.
*H02J 3/16*   (2006.01)
*H02J 3/00*   (2006.01)

(52) U.S. Cl.
CPC ............. *H02J 3/16* (2013.01); *H02J 3/001* (2020.01)

(58) Field of Classification Search
CPC .................... H02J 3/16; H02J 3/00
See application file for complete search history.

(56) References Cited

U.S. PATENT DOCUMENTS

| | | | | |
|---|---|---|---|---|
| 8,519,681 B2* | 8/2013 | Mathewson | ............ | G05F 1/14 323/341 |
| 2002/0097055 A1* | 7/2002 | Pinzon | ............ | H02J 3/242 324/525 |

(Continued)

FOREIGN PATENT DOCUMENTS

| | | |
|---|---|---|
| EP | 2333926 A2 | 6/2011 |
| EP | 3591785 A1 | 1/2020 |
| GB | 2410386 A | 7/2005 |

OTHER PUBLICATIONS

Deutsche Energie-Agentur GmbH (Dena German Energy Agency) Observability and controllability in the energy system, Need for action analysis of dena's System Services Platform. Jul. 2016, Berlin, Germany.

(Continued)

*Primary Examiner* — Rexford N Barnie
*Assistant Examiner* — Joseph N Inge
(74) *Attorney, Agent, or Firm* — Marshall & Melhorn, LLC

(57) ABSTRACT

Disclosed is an electrical power system having a transmission system with a first voltage, a distribution network with a second voltage, and a coupling unit having a coupling ratio, and a distributed generation unit DGU to generate the electric power and be in a communication with the distribution network. The system may also have a control unit to control the coupling unit and the DGU in an emergency operating mode to bring and/or to keep the value of the first voltage between a first threshold and a third threshold, and/or the value of the second voltage between a second threshold and a fourth threshold, the first threshold corre- (Continued)

sponding to the value of the first voltage at the time of entry into the emergency operating mode and the second threshold corresponding to the value of the second voltage at the time of entry into the emergency operating mode.

17 Claims, 1 Drawing Sheet

(56) References Cited

U.S. PATENT DOCUMENTS

| | | | |
|---|---|---|---|
| 2009/0230980 A1* | 9/2009 | Williams | G01R 27/32 |
| | | | 324/707 |
| 2020/0011297 A1* | 1/2020 | Hillebrandt | H02P 9/006 |

OTHER PUBLICATIONS

Enzenhofer, R., Kooperation im intelligenten Engergienetz (TSO-DSO cooperation in the smart energy grid), Feb. 2020. https://www.csells.net/images/Poster_Ministerdialog_BY_19/Praesentationen_EWorld_2020/Enzenhofefer_2020-02-11_EWorld2020.pdf.

German Patent and Trademark Office, German Office Action in Application No. DE 10 2020 209 715.1, dated Mar. 15, 2021, 12 pages, Munich, Germany.

European Patent and Trademark Office, International Search Report and Written Opinion in Application No. PCT/EP2021/068968, dated Oct. 21, 2021, Rijswijk, Netherlands.

* cited by examiner

ELECTRICAL POWER SYSTEM

FIELD

The present invention relates to an electrical power system and a method for an emergency control of an electrical power system. The invention also relates to the use of an electrical power system.

BACKGROUND

The electrical power system is a device that is configured to transmit and distribute an electrical power, wherein electrical power relates to a voltage in combination with an electrical current. The electrical power may be generated by at least one generation unit and it may be transmitted via a transmission system and/or distributed via a distribution network to an electrical consumer of the electrical power, wherein the consumed amount of electrical power may also be denoted as a load, an electrical load or a load power. The generation unit, the transmission system, the distribution network and the electrical consumer may be considered as members of the electrical power system.

Within the electrical power system, one member may interact with another member of the electrical power system. Therefore, a change of a value of the voltage and/or a value of the electrical current of one member may affect the value of the voltage and/or the value of the electrical current of another member of the electrical power system.

A value of the voltage may be, for example but not limited to, an amplitude value of the voltage or a root mean square value of the voltage. The same applies analogously to the electrical current. A change of the value of the voltage and/or the value of the electrical current may occur if the amount of the electrical power generated by the at least one generation unit and/or consumed by the electrical consumer changes. In particular, in the event of a rapid change of the generation and/or the consumption of the electrical power, a drop of the value of the voltage in the electrical power system may occur that may further cause a damage to one or more of the members of the electrical power system. Such events may hence cause an emergency situation and it is important for an operator of the electrical power system to counteract immediately by an activation of a control action to prevent the damage to one or more of the members of the electrical power system. The activation of the control action may be implemented by putting a control unit into an emergency operating mode wherein the control unit may execute control actions specific to the emergency operating mode.

SUMMARY

Thus, the problem of the invention is to provide appropriate control schemes, particularly emergency control schemes and to enhance system stability.

This problem is solved by the electrical power system and the method for controlling the electrical power system according to the independent claims. The electrical power system and the method may hence be advantageously applied to prevent a damaging of the members of the electrical power system.

Advantageous embodiments and further developments and modifications of the invention are to be deduced from the features of the dependent claims and the following description.

The electrical power system comprises a transmission system configured to transmit electrical power using a first voltage. The transmission system may, for example, include a power pylon, a power supply line and/or an electric wire. The first voltage may be, for example, a high voltage, for example a voltage with a value between 110 kV and 1150 kV, wherein a typical value may be 110 kV, 220 kV or 380 kV. The transmission system may transport the electrical power over a long distance, for example between countries or regions. It may also transport the electrical power within a region. The electrical power may be generated by a generation unit, for example a power plant.

The electrical power system comprises a distribution network configured to distribute the electrical power using a second voltage and configured to be in an electrical and/or electromagnetic communication with the transmission system via a coupling unit having a coupling ratio. The distribution network may, for example, include a power pylon, a power supply line and/or an electric wire. The second voltage may be, for example, a medium voltage, for example a voltage between 6 kV and 110 kV, wherein a typical value may be between 30 kV and 60 kV or between 6 kV and 20 kV. The distribution network may distribute the electrical power to the electrical consumer, for example an industrial facility or a low voltage network including on or more of the electrical consumers in trade, commerce, transport and/or households.

The coupling unit comprises a transformer providing an electromagnetic coupling from a primary side to a secondary side of the transformer. It may also provide an electromagnetic coupling from the secondary side to the primary side of the transformer. The primary side of the transformer may be electrically connected to the transmission system and the secondary side of the transformer may be electrically connected to the distribution network. The coupling ratio may be a ratio of the value of the first voltage to the value of the second voltage. The transformer may include a number of primary winding turns of a wire on the primary side and a number of secondary winding turns of a wire on the secondary side. The coupling ratio may also correspond to the ratio of the number of winding turns on the primary side to the number of winding turns on the secondary side. It may be that the coupling ratio is variable and that it may be changed by changing the number of the winding turns on the primary side and/or the number of the winding turns on the secondary side.

There is also a possibility that the coupling unit may comprise a voltage source converter using a semiconductor device like, for example, an insulated-gate bipolar transistor. It may also comprise a mercury arc valve, a thyristor valve, a capacitor-commutated converter and/or an electromechanical system like an electrical motor and/or electrical generator.

The electrical power system includes at least one distributed generation unit (DGU) configured to generate the electrical power and be in an electrical and/or electromagnetic communication with the distribution network. The DGU may be, for example, include a solar power generation unit like a solar panel, a water power generator, a wind turbine, a biomass power generator or another type of an electrical generator. It may also include a phase shifter. Typically, the DGU generates less power than a conventional power plant, for example in the range of about 1 kW up to about, but not limited to, 20 MW. The DGU may be controllable.

The electrical power system also includes the control unit configured to control the coupling unit at least in an emergency operating mode to bring and/or to keep the value of the first voltage in a voltage range between a first threshold Vtmin and a third threshold Vtmin' being greater than Vtmin by a predetermined first voltage amount δ, and/or the value of the second voltage in a voltage range between a second threshold Vdmax and a fourth threshold Vdmax' being less than Vdmax by a predetermined second voltage amount ∈.

The voltage ranges may correspond to a limit of a stability of the electrical power system, wherein the stability includes the capability of the electrical power system to transmit and/or to distribute electrical power while maintaining one or more quality criteria such as, for example but not limited to, keeping a voltage value within a predefined range and/or keeping a voltage frequency within a predefined range. For example, the electrical consumer may disconnect or may be disconnected from the electrical power system if the second voltage is outside a predetermined range, for example in order to protect the electrical consumer from being damaged or in order to ensure a proper functioning of the electrical consumer. A disconnection of the electrical consumer may lead to further changes of the value of the first voltage and/or the value of the second voltage and hence effectuate the disconnection of a further electrical consumer from the electrical power system and/or effectuate a reconnection of another electrical customer to the electrical power system. This may lead to a chain reaction and eventually to a collapse of the electrical power system which may also cause the damage of one or more of the members of the electrical power system.

There may be different degrees of stability depending on to what extent the one or more quality criteria are met. This means that a loss of stability may define that the extent of how the one or more quality criteria are met decreases. A loss of stability may lead to an instability wherein instability may comprise a collapse of the electrical power system including, for example, a missing capability to transmit electrical power and/or to distribute electrical power and/or a missing capability to maintain one or more of the one or more quality criteria.

The predetermined first voltage amount δ may be an absolute voltage value or a relative voltage value, for example a percentage of the value of the first voltage. The predetermined second voltage amount ∈ may be an absolute voltage value or a relative voltage value, for example a percentage of the value of the second voltage.

The control unit may comprise a computer and/or a microcontroller. It may be located in a single location, but also distributed over a number of different locations. The control unit may comprise a human machine interface to operate the control unit by a human operator. It may also have a communication interface providing the potential to connect to another control unit, to another computer, to another microcontroller or, in general, other machines. Furthermore, the control unit may comprise a processing unit and/or a memory. The memory may be configured to contain data and/or a program. In addition, the control unit may include a control interface configured to control the one or more members of the electrical power system, for example the coupling unit and/or the DGU. The control interface may include an input and an output. The control interface may, for example, be electrical, magnetic, electromagnetic and/or optical. The control interface may also comprise a computer network interface, for example for a wireless network, a mobile communication network and/or a wired network, such as Ethernet, Profinet, Profibus, Controller Area Network (CAN) or another field bus system.

The control unit comprises one or more operating modes, wherein each of the operating modes may include operations that relate to a state of the electrical power system. The state of the electrical power system may correspond to the value of the first voltage and/or the value of the second voltage. It may, however, also relate to, for example, the amount of electrical power transmitted and/or distributed, to the available power generated by the at least one DGU and/or to an event and/or a time sequence of events related to the electrical power system. The event may be, for example, an execution of a control action and/or a measurement and/or the provision of a measurement result and/or a value of a measurement result, for example the value of the first voltage and/or the value of the second voltage. The state of the electrical power system may also describe the stability of the electrical power system, for example the state of the electrical power system may assume a value 'stable operation', indicating a stable operation that is the stability, of the electrical power system, or a value 'loss of stability'. The definition 'loss of stability' may include a risk of a loss of stability, risk of a potential loss of stability and also a risk of a potential instability or an instability. It is preferred that the emergency mode is entered before an onset of an instability. The control unit may enter the emergency operating mode for example upon the detection of the state of the electrical power system that may indicate the 'loss of stability' thereof. It may be that the control unit detects a 'loss of stability' itself. It may also be that the control unit receives the information about a 'loss of stability' via one or more of the interfaces of the control unit. The control unit may also be commanded to enter the emergency operating mode. It may be possible, for example, that the control unit receives commands, for example a command to enter the emergency operation mode, via one of its interfaces.

The coupling unit may have a control interface configured to provide a control connection to the control unit. The control unit may base the control of the coupling unit on a value of the first voltage and a value of the second voltage, for example to perform a closed loop control. To perform control, the control unit may comprise a measurement device configured to measure the value of the first voltage and/or the value of the second voltage. It may also be that the control unit receives the value of the first voltage and/or the value of the second voltage via the communication interface and/or the human machine interface and/or the control interface.

Additionally to the control of the coupling unit the control unit is configured to control the at least one DGU to bring and/or to keep the value of the first voltage in the voltage range between the first threshold Vtmin and the third threshold Vtmin', and/or the value of the second voltage in the voltage range between the second threshold Vdmax and the fourth threshold Vdmax'.

Controlling the at least one DGU may comprise controlling the amount of electrical power generated by the at least one DGU. For example, the control unit may control the at least one DGU to stop or to start generating power or it may control the at least one DGU to generate a certain amount of electrical power and/or to increase and/or to decrease the amount of electrical power generated by the DGU. The electrical power may comprise a real power and/or a reactive power. The control unit may a control the DGU to generate a certain ratio of the real power to the reactive power.

The control unit may coordinate and/or synchronize the control of the DGU and the coupling unit. That is, when deciding about a control action, the control unit may consider both, an effect of the DGU and an effect of the coupling unit on the electrical power system, simultaneously and may then perform the controlling of the DGU and the coupling unit in parallel, for example in a coordinated manner.

The DGU may have a control interface configured to provide a control connection to the control unit. The control unit may base the control of the at least one DGU on a value of the first voltage and a value of the second voltage, for example to perform a closed loop control.

The control unit is further configured to determine the first threshold Vtmin corresponding to the value of the first voltage at the time of entry into the emergency operating mode and the second threshold Vdmax corresponding to the value of the second voltage at the time of entry into the emergency operating mode. This choice of Vtmin and Vdmax may provide the basis for an adaptive control scheme which is particularly adapted to a state of the electrical power system. Furthermore, it allows for a control action that does not provoke further electrical consumers to disconnect from the electrical power system which may lead to the loss of stability or even the collapse of the electrical power system.

The rationale behind this choice for Vtmin and Vdmax may be twofold:
  first voltage should not fall below its value at the time of entry into the emergency operating mode, wherein Vtmin may be considered as a critical voltage level and efforts are directed towards staying above this critical value; and
  the second voltage should not rise above its value at the time of entry into the emergency operating mode in order to avoid a load power recovery, wherein a load power recovery may comprise an increase of the consumption of electrical power and/or reconnecting electrical load and/or connecting further electrical load to the distribution network.

Vtmin may be defined to differ from the value of the first voltage at the time of entry into the emergency operating mode by less than 1 percent, preferably 0.5 percent and most preferably 0 percent of the value of the first voltage at the time of entry into the emergency operating mode. It may be that Vtmin is chosen to be not less than the value of the first voltage at the time of entry into the emergency operating mode. However, by choosing Vtmin slightly greater, for example 0.5 percent, than the value of the first voltage at the time of entry into the emergency operating mode it may also be possible to bring/keep the value of the first voltage and/or the value of the second voltage into the ranges defined by the first to fourth thresholds.

The second threshold Vdmax may be defined to differ from the value of the second voltage at the time of entry into the emergency operating mode by less than 1 percent, preferably 0.5 percent and most preferably 0 percent of the value of the second voltage at the time of entry into the emergency operating mode. It may be that Vdmax is chosen to be not greater than the value of the second voltage at the time of entry into the emergency operating mode. However, by choosing Vdmax slightly less, for example 0.5 percent or 1 percent, than the value of the second voltage at the time of entry into the emergency operating mode it may also be possible to bring/keep the value of the first voltage and/or the value of the second voltage into the ranges defined by the first to fourth thresholds.

The electrical power system may comprise a control unit configured, when operating in the emergency operating mode, to control the coupling unit such that
  the coupling ratio is constant if the value of the first voltage is less than the first threshold Vtmin and the value of the second voltage is less than the second threshold Vdmax,
  the coupling ratio is increased if the value of the second voltage is greater than the second threshold Vdmax, and
  the coupling ratio is decreased if the value of the second voltage is less than the fourth threshold Vdmax' and the value of the first voltage is greater than the third threshold Vtmin' and
  the coupling ratio is substantially constant otherwise.

The one or more control actions may be implemented by means of a software program that resides within the memory of the control unit, wherein the control unit is configured to control the coupling unit in order to set the coupling ratio. For this, the control unit may receive a control signal from the coupling unit via the input and/or send a control signal to the coupling unit via the output. It may be that the control signals are electrical, electromagnetic and/or optical. It may also be that the control unit controls the coupling unit via a network communication interface. The coupling unit may have an interface corresponding to the interface of the control unit and configured to communicate with the control unit. The coupling unit may also have an actuator configured to set the coupling ratio according to the control action of the control unit.

It is possible that the electrical power generated by the at least one DGU comprises a reactive power. The electrical power system may hence comprise a control unit configured, when operating in the emergency operating mode, to control the at least one DGU such that
  the generation of reactive power is increased if the value of the first voltage is less than the first threshold Vtmin and the value of the second voltage is less than the second threshold Vdmax and
  the generation of reactive power is substantially constant otherwise.

In certain embodiments the at least one DGU may be controlled to consume reactive power and/or real power. The purposeful injection and/or consumption of reactive power may affect a power factor in the distribution network which may affect the stability of the electrical power system.

As mentioned above in connection with controlling the coupling unit the one or more control actions are implemented by means of a software program that resides within the memory of the control unit, wherein the control unit is configured to control the at least one DGU. For this, the control unit may receive a control signal from the at least one DGU via the input and/or send a control signal to the DGU via the output. It may be that the control signals are electrical, electromagnetic and/or optical. The control unit may as well control the at least one DGU via a network communication interface. The at least one DGU may have an interface corresponding to the interface of the control unit and configured to communicate with the control unit. The at least one DGU may also have an actuator configured to execute an action according to the control action of the control unit, for example a switch or an inverter.

In certain embodiments it is possible that the coupling unit comprises a distribution transformer. In order to adapt the coupling ratio it is further possible that the coupling unit includes a load tap changer. With the load tap changer it may be possible to adjust the number of winding turns optionally on the primary side and/or on the secondary side of the distribution transformer, wherein the primary side may be the preferred option. For example, increasing the number of winding turns on the primary side may increase the coupling ratio. Reducing the number of winding turns on the primary side may decrease the coupling ratio. The load tap changer may adjust the number of winding turns on the primary side according to a plurality of predetermined settings and hence change the coupling ratio which may also be denoted as tap ratio. The load tap changer may be controllable by the control unit. It may be considered as the actuator of the coupling unit.

In an advantageous embodiment the electrical power system comprises a sensor unit configured to detect the value of the first voltage and the value of the second voltage and be in communication with the control unit. The sensor unit may provide the value of the first voltage and/or the value of the second voltage, for example measured at different times and/or the same time, as a single value and/or as a time series, to the control unit. It may be possible that the control unit determines when to enter the emergency operating mode. It may use the measured voltage values, for example, to monitor the electrical power system and to make a decision when to enter the emergency operating mode, for example if a 'loss of stability' is detected. The 'loss of stability' may be detected, for example, in the case when the value of the first voltage and/or the value of the second voltages is below a predefined threshold. The values of the first voltage and of the second voltage may also be used to determine the first to fourth threshold. Furthermore, the voltages may be used as a feedback when controlling the at least one DGU and the coupling unit.

A method or a part of the method for a control of an electrical power system in an emergency operating mode is implemented by means of a software program that is stored in the memory of the control unit configured to control the coupling unit and/or the at least one DGU.

The method for the control of the electrical power system in the emergency operating mode comprises controlling the coupling unit and/or the at least one DGU to bring and/or to keep
- the value of the first voltage in a voltage range between first threshold Vtmin and a third threshold Vtmin' being greater than Vtmin by a predetermined first voltage amount δ, and/or
- the value of the second voltage in a voltage range defined by the second threshold Vdmax and a fourth threshold Vdmax' being less than Vdmax by a predetermined second voltage amount ∈.

The voltage ranges may correspond to a limit of the stability of the electrical power system as explained above. Likewise, as defined above, the predetermined first voltage amount δ may be an absolute voltage value or a relative voltage value, for example a percentage of the value of the first voltage. The predetermined second voltage amount ∈ may be an absolute voltage value or a relative voltage value, for example a percentage of the value of the second voltage.

One objective of this control scheme is to stabilize the electrical power system and/or to prevent a destabilization or an instability of the electrical power system, that is, an increasing 'loss of the stability' of the electrical power system which may cause a damage of one or more of the members of the electrical power system.

A possible implementation of the proposed method may comprise controlling the coupling unit and/or the at least one DGU such that the value of the first voltage substantially assumes a first target value and the value of the second voltage substantially assumes a second target value. The first target value may be a value between the first threshold Vtmin and the third threshold Vtmin', for example an average of Vtmin and Vtmin', and the second target value may be a value between the second threshold Vdmax and the fourth threshold Vdmax', for example an average of Vdmax and Vdmax'.

The method for the control of the electrical power system in the emergency operating mode also comprises determining the first threshold Vtmin corresponding to the value of the first voltage at the time of entry into the emergency operating mode and the second threshold Vdmax corresponding to the value of the second voltage at the time of entry into the emergency operating mode. The advantages of this choice of Vtmin and Vdmax have been explained above. In particular, by not provoking further electric consumers to disconnect from and/or to connect and/or reconnect to the electrical power system and/or to increase the consumption of electrical power, the method for the control of the electrical power system may be regarded as non-intrusive, that is, it does not affect the distribution network operation in order to support the transmission system.

The method for the control of the electrical power system in the emergency operating mode may also comprise controlling the coupling unit such that
- the coupling ratio is constant if value of the first voltage is less than the first threshold Vtmin and the value of the second voltage is less than the second threshold Vdmax,
- the coupling ratio is increased if the value of the second voltage is greater than the second threshold Vdmax, and
- the coupling ratio is decreased if the value of the second voltage is less than the fourth threshold Vdmax' and the value of the first voltage is greater than the third threshold Vtmin' and
- the coupling ratio is substantially constant otherwise.

Controlling the coupling unit may include receiving a control signal by the control unit via the input of the control unit wherein the control signal is sent by the coupling unit. Controlling the coupling unit may also comprise sending a control signal to the coupling unit by the control unit via the output of the control unit wherein the control signal is received by the coupling unit. Controlling the coupling unit may include controlling the coupling unit by the control unit via a network communication interface.

The method for the control of the electrical power system in the emergency operating mode may include controlling the at least one DGU such that
- the generation of reactive power is increased if the value of the first voltage is less than the first threshold Vtmin and the value of the second voltage is less than the second threshold Vdmax and
- the generation of reactive power is substantially constant otherwise.

Controlling the at least one DGU may include receiving a control signal from the at least one DGU via the input and/or sending a control signal to the at least one DGU via the output of the control unit. It may be that the control signals are electrical, electromagnetic and/or optical. Controlling the at least one DGU may include controlling the at least one DGU by the control unit via a network communication interface.

Controlling the DGU and the coupling unit may be performed in a coordinated and/or synchronized manner. That is, when deciding about a control action, the control unit may consider both, an effect of the DGU and an effect of the coupling unit on the electrical power system, simultaneously and may then perform the controlling of the DGU and the coupling unit in parallel, for example in a coordinated manner.

The method for the control of the electrical power system in the emergency operating mode may also include providing a sensor unit, detecting a value of the first voltage and a value of the second voltage. It may also include providing the first voltage and/or the second voltage to the control unit. The control unit may use the value of the first voltage and/or the value of the second voltage for determining when to enter the emergency operating mode. As explained above, the detected value of the first voltage and/or the detected of the second voltage may be used as feedback signals in a closed loop control for controlling the value of the first voltage and/or the value of the second voltage. These values, however, may also be used to estimate a further quantity, such as a stability margin, a degree of utilization of the transmission system and/or the distribution network or to determine a predicted value for one or more of these estimates. The detected values of the first voltage and/or the second voltage may also be used for a documentation and/or a planning of the transmission system and/or the distribution network. For this, the detected values may be transferred to a memory.

The method for the control of the electrical power system in the emergency operating mode may comprise the step determining when to enter the emergency operating mode. This step, for example, may include comparing the first voltage with a first predefined reference value and comparing the second voltage with a second predefined reference value. This step may also include observing the amount of electrical power transmitted and/or distributed, the available power generated by the at least one DGU and/or events and/or a time sequence of events related to the electrical power system. Events may be, for example, an execution of a control action and/or a measurement and/or the provision of a measurement result and/or a value of a measurement result, for example the value of the first voltage and/or the second voltage.

The method may also comprise receiving the information about a loss of stability via one or more of the interfaces of the control unit. And the method may also comprise being commanded to enter the emergency operating mode.

The electrical power system may be used in a power supply network, for example to supply electrical power to an industrial facility, a factory, a trade, a commercial service, a transport and/or a private household and it may, for example, receive the electrical power from a power plant and/or a distributed generation unit such as a wind turbine, a photovoltaic solar power plant, a hydroelectric power station, a biomass power generator and/or a phase shifter.

The advantages of the electrical power system and the method for the control of the electrical power system include its capability to stabilize both, the transmission system and the distribution network in the case of an emergency and to improve their long-term voltage stability, in particular without affecting the operation of the distribution network. The electrical power system and the method for the control of the electrical power system may hence be regarded as non-intrusive. Furthermore, they comply with the following criteria:

The distribution network is minimally affected for supporting the first voltage in the transmission system.

The control method may adapt itself to a severity of the emergency. A less critical situation triggers a milder control action. This avoids over-using of assets of an operator of the distribution network.

The control method may detect the emergency situation and act accordingly based on locally available information, that is, the value first voltage value and the value of the second voltage.

All control steps of the proposed method are based on two local measurements, that is, the detection of the value of the first voltage value and the value of the second voltage.

The control steps of the proposed method accommodate various transmission system characteristics at the coupling unit, for example a short circuit power or a sensitivity to reactive power variations.

The electrical power system and the proposed method also accommodate various load characteristics, for example various types of loads and their dependency on voltage variations.

DESCRIPTION OF THE FIGURES

The invention will be described below with reference to preferred embodiments and the accompanying drawings, where.

DETAILED DESCRIPTION

Figure 1:
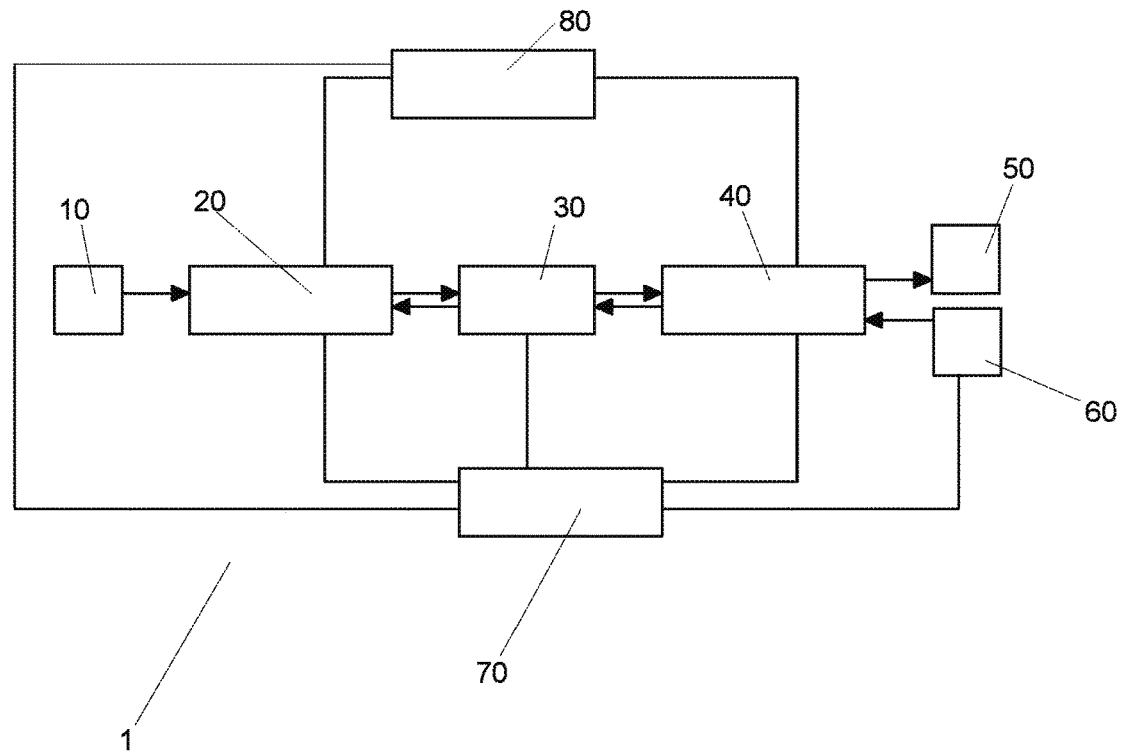
FIG. 1 shows a conceptual diagram of an electrical power system according to an embodiment of the disclosure.

An electrical power system 1 shown in FIG. 1 comprises a power generation unit 10, for example a power plant that generates an electrical power, for example based on a fossil energy source like coal, oil or gas, a nuclear energy source and/or a renewable energy source like biomass, wind power, water power and/or solar power.

The electrical power generated by the power generation unit 10 is transmitted via a transmission system 20. The transmission system 20 may comprise a power pylon, a power supply line and an electric wire to transmit the electrical power. The electrical power in the transmission system 20 has a first voltage 101 (not shown in FIG. 1). The first voltage 101 may be a high voltage, for example a voltage between 110 kV and 1150 kV, wherein a typical value may be 110 kV, 220 kV or 380 kV. The transmission system 20 may transmit the electrical power over a long distance, for example between countries or regions. It may also transmit the electrical power within a region.

The electrical power system 1 as shown in FIG. 1 includes a distribution network 40 which is coupled with the transmission system 20 via a coupling unit 30.

The distribution network 40 may include a power pylon, a power supply line and an electric wire. The electrical power in the distribution network 40 has a second voltage 102 (not shown in FIG. 1). The second voltage 102 may be, for example, a medium voltage, for example a voltage between 6 kV and 110 kV, wherein a typical value may be between 30 kV and 60 kV or between 6 kV and 20 kV. The distribution network 40 distributes the electrical power to an electrical consumer 50, for example an industrial facility or a low voltage network including one or more of the electrical consumers in trade, commerce, transport and/or households.

The coupling unit 30 comprises a transformer, which may also be denoted as distribution transformer, and which provides an electromagnetic coupling from a primary side to a secondary side of the transformer. For example, the primary side of the transformer is electrically connected to the transmission system 20 and the secondary side of the transformer is electrically connected to the distribution network 40. The coupling unit 30 has a coupling ratio. The coupling ratio is a ratio of the value of the first voltage 101 to the value of the second voltage 102. The transformer includes a number of primary winding turns of a wire on the primary side and a number of secondary winding turns of a wire on the secondary side. The coupling ratio corresponds to the ratio of the number of winding turns on the primary side to the number of winding turns on the secondary side. The coupling ratio is variable. It may be changed by changing the number of the winding turns on the primary side and/or the number of the winding turns on the secondary side.

The number of winding turns may be changed using a load tap changer. With the load tap changer it is possible to adjust the number of winding turns optionally on the primary side and/or on the secondary side of the transformer. If the load tap changer is installed on the primary side, increasing the number of winding turns on the primary side increases the coupling ratio. Reducing the number of winding turns on the primary side decreases the coupling ratio. With the load tap changer it is possible to adjust the number of winding turns on the primary side, for example according to a plurality predetermined settings and hence change the coupling ratio accordingly. The coupling ratio adjusted with the load tap changer may also be denoted as a tap ratio.

The electrical power system 1 in FIG. 1 comprises at least one distributed generation unit DGU 60. The DGU 60 is configured to generate the electrical power which includes the real power and/or the reactive power. In FIG. 1, the DGU 60 is coupled with the distribution network 40. This coupling may comprise an electrical component, for example a power electronic component like an insulated-gate bipolar transistor. The coupling may also comprise an electromagnetic component, for example a transformer. The coupling may also include an electro-mechanical component, for example a motor-generator, and it may comprise an electro-chemical component, for example a hydrolysis device and/or a fuel cell.

The DGU 60 is controlled by a control unit 70. The control unit 70 may comprise a computer and/or a microcontroller. It is located in a single location. It may, however, also be distributed over a number of different locations. The control unit 70 comprises a processing unit and/or a memory. The memory contains data and a program to execute control actions. In addition, the control unit 70 includes a control interface to control the one or more members of the electrical power system 1, for example the coupling unit 30 and the DGU 60.

The control unit 70 has at least one emergency operating mode, relating to a state of the electrical power system 1. The control unit 70 enters the emergency operating mode, as explained above, upon the detection of the state of the electrical power system 1 that indicates the loss of the stability thereof.

The electrical power system 1 includes a sensor unit 80. The sensor unit 80 detects the value of the first voltage 101 and/or the value of the second voltage 102 and is in communication with the control unit 70. The sensor unit 80 provides the value of the first voltage 101 and the value of the second voltage 102, for example measured at different times and/or the same time, as a single value and/or as a time series, to the control unit 70. The control unit 70 determines when to enter the emergency operating mode and for this decision it uses at least one of the detected voltage values. For example, the control unit 70 may decide to enter the emergency operating mode if the first voltage 101 falls below 0.95 pu, wherein pu denotes the per-unit system known to a person skilled in the art.

Figure 2:
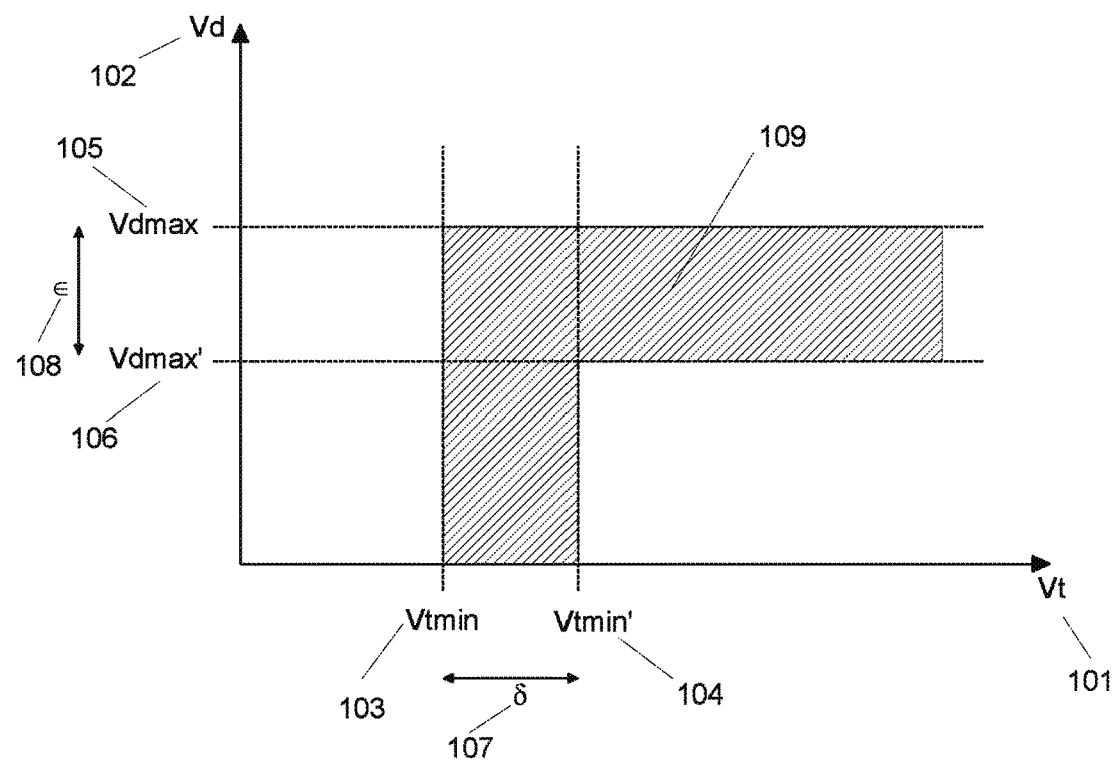
FIG. 2 shows a diagram of a first voltage at which the electrical power is transmitted via the transmission system and a second voltage at which the electrical power is distributed via the distribution network.

FIG. 2 shows a diagram of the first voltage 101 and the second voltage 102. The value of the first voltage 101 is the voltage value at which the electrical power is transmitted via the transmission system 20. The value of the second voltage 102 is the voltage value at which the electrical power is distributed via the distribution network 40. The first voltage 101 and the second voltage 102 are in communication via the coupling unit 30. The ratio of the first voltage 101 to the second voltage 102 is determined by the coupling ratio of the coupling unit 30. The coupling ratio of the coupling unit 30 is controlled by the control unit 70.

FIG. 2 also shows a first threshold Vtmin 103 and a third threshold Vtmin' 104 being greater than Vtmin 103 by a predetermined first voltage amount $\delta$ 107, and a second threshold Vdmax 105 and a fourth threshold Vdmax' 106 being less than Vdmax 105 by a predetermined second voltage amount $\in$ 108. The predetermined first voltage amount $\delta$ 107 is an absolute voltage value or a relative voltage value, for example a percentage of the value of the first voltage 101. The predetermined second voltage amount $\in$ 108 is an absolute voltage value or a relative voltage value, for example a percentage of the value of the second voltage 102. For example, the first voltage amount $\delta$ may be set to 0.01 pu and the second voltage amount $\in$ may be set to 0.02 pu. Of course, in other embodiments of the invention other values for $\delta$ and $\in$ may be used as well.

The control unit 70 determines the first threshold Vtmin 103 equal to the value of the first voltage 101 at the time of entry into the emergency operating mode and the second threshold Vdmax 105 equal to the value of the second voltage 102 at the time of entry into the emergency operating mode. This choice of Vtmin 103 and Vdmax 105 provides the basis for an adaptive control scheme which is particularly adapted to the state of the electrical power system 1.

Alternatively and as explained above, Vtmin 103 may be defined to differ from the value of the first voltage 101 at the time of entry into the emergency operating mode, for example, by choosing Vtmin 103 0.5 percent greater than the value of the first voltage 101 at the time of entry into the emergency operating mode.

Also as an alternative and as explained above, the second threshold Vdmax 105 may be defined to differ from the value of the second voltage 102 at the time of entry into the emergency operating mode, for example, by choosing Vdmax 105 0.5 percent or 1 percent less than the value of the second voltage 102 at the time of entry into the emergency operating mode.

The method for the control of the electrical power system 1 in the emergency operating mode comprises controlling the coupling unit 30 and/or the at least one DGU 60 to bring and/or to keep the value of the first voltage 101 and the value of the second voltage 102 in a target area 109, wherein the target are 109 is the area in the diagram of FIG. 2 where the value of the first voltage 101 is in a voltage range between first threshold Vtmin 103 and the third threshold Vtmin' 104 being greater than Vtmin 103 by the predetermined first voltage amount $\delta$ 107, and the value of the second voltage 102 is less than the second threshold Vdmax 105, and/or the value of the second voltage 102 in a voltage range defined by the second threshold Vdmax 105 and a fourth threshold Vdmax' 106 being less than Vdmax 105 by the predetermined second voltage amount ∈ 108, and the value of the first voltage 101 is greater than the first threshold Vtmin 103.

The method for the control of the electrical power system 1 in the emergency operating mode also comprises controlling the coupling unit 30 such that the coupling ratio is constant if the value of the first voltage 101 is less than the first threshold Vtmin 103 and the value of the second voltage is less than the second threshold Vdmax 105. Leaving the coupling ratio constant stops a load power recovery, wherein a load power recovery may comprise connecting a further electrical consumer 50 to the distribution network 40, and wherein the load power recovery may be responsible for a decrease of the value of the first voltage 101.

The method for the control of the electrical power system 1 in the emergency operating mode also comprises controlling the coupling unit 30 such that the coupling ratio is increased if the value of the second voltage 102 is greater than the second threshold Vdmax 105. Increasing the coupling ratio reduces the value of the second voltage 102 in order to bring the value of the second voltage 102 to a value below the second threshold Vdmax 105. Increasing the coupling ratio also promotes the increase of the value of the first voltage 101.

The method for the control of the electrical power system 1 in the emergency operating mode also comprises controlling the coupling unit 30 such that the coupling ratio is decreased if the value of the second voltage 102 is less than the fourth threshold Vdmax' 106 and the value of the first voltage 101 is greater than the third threshold Vtmin' 104. This increases the second voltage 102 to the desired range. Alternatively, this goal could be achieved with controlling the at least one DGU 60 as well. However, changing the coupling ratio may be a preferred option.

The method for the control of the electrical power system 1 in the emergency operating mode also comprises controlling the coupling unit 30 such that the coupling ratio is substantially constant as long as the value of the first voltage 101 and the value of the second voltage 102 are within the target area 109.

The method for the control of the electrical power system 1 in the emergency operating mode includes controlling the at least one DGU 60 such that the generation of reactive power is increased if the value of the first voltage 101 is less than the first threshold Vtmin 103 and the value of the second voltage 102 is less than the second threshold Vdmax 105. The generation of reactive power is substantially constant otherwise. The increase of reactive power is aimed at injecting reactive power into the transmission system 20 to raise the first voltage 101 or at least reduce the reactive power that the transmission system 20 delivers to the distribution network 40. It can be also seen as improvement of a power factor at the coupling unit 30. Freezing the reactive power injection puts an end to the counterproductive effect of the load power recovery under the effect of an increasing value of the second voltage 102.

What is claimed is:

1. An electrical power system, comprising:
 a transmission system configured to transmit a first electrical power using a first voltage;
 wherein said first electrical power is produced by a power generation unit,
 a distribution network configured to distribute the first electrical power using a second voltage and configured to be in an electrical or electromagnetic communication with the transmission system via a coupling unit having a coupling ratio;
 at least one distributed generation unit DGU configured to generate a second electrical power and be in an electrical or electromagnetic communication with the distribution network,
 wherein the second electrical power is generated independently from the power generation unit,
 a control unit configured to control the coupling unit at least in an emergency operating mode to bring or to keep
  the value of the first voltage in a voltage range between a first threshold Vtmin and a third threshold Vtmin' being greater than Vtmin by a predetermined first voltage amount δ, or
  the value of the second voltage in a voltage range between a second threshold Vdmax and a fourth threshold Vdmax' being less than Vdmax by a predetermined second voltage amount ε,
 wherein
 additionally to the control of the coupling unit the control unit is configured to control the at least one DGU to bring or to keep
  the value of the first voltage in the voltage range between the first threshold Vtmin and the third threshold Vtmin', or
  the value of the second voltage in the voltage range between the second threshold Vdmax and the fourth threshold Vdmax'; and
 the control unit is further configured to determine the first threshold Vtmin corresponding to the value of the first voltage at the time of entry into the emergency operating mode and the second threshold Vdmax corresponding to the value of the second voltage at the time of entry into the emergency operating mode.

2. The electrical power system according to claim 1, wherein Vtmin is defined to differ from the value of the first voltage at the time of entry into the emergency operating mode by less than 1 percent, preferably 0.5 percent and most preferably 0 percent of the value of the first voltage at the time of entry into the emergency operating mode.

3. The electrical power system according to claim 1, wherein the second threshold Vdmax is defined to differ from the value of the second voltage at the time of entry into the emergency operating mode by less than 1, preferably 0.5 percent and most preferably 0 percent of the value of the second voltage at the time of entry into the emergency operating mode.

4. The electrical power system according to claim 3, wherein the control unit is configured, when operating in the emergency operating mode, to control the coupling unit such that
 the coupling ratio is constant if the value of the first voltage is less than the first threshold Vtmin and the value of the second voltage is less than the second threshold Vdmax,
 the coupling ratio is increased if the value of the second voltage is greater than the second threshold Vdmax, and
 the coupling ratio is decreased if the value of the second voltage is less than the fourth threshold Vdmax' and the value of the first voltage is greater than the third threshold Vtmin' and
 the coupling ratio is substantially constant otherwise.

5. The electrical power system according to claim 4, wherein the second electrical power generated by the at least one DGU comprises a reactive power.

6. The electrical power system according to claim 5, wherein the control unit is configured, when operating in the emergency operating mode, to control the at least one DGU such that
the generation of reactive power is increased if the value of the first voltage is less than the first threshold Vtmin and the value of the second voltage is less than the second threshold Vdmax and
the generation of reactive power is substantially constant otherwise.

7. The electrical power system according to claim 1, wherein the coupling unit comprises a load tap changer and wherein the coupling ratio includes a tap ratio.

8. The electrical power system according to claim 1, further comprising a sensor unit configured to detect a value of the first voltage and a value of the second voltage and be in communication with the control unit.

9. The electrical power system according to claim 1, wherein control unit is configured to determine when to enter the emergency operating mode.

10. A method for a control of an electrical power system in an emergency operating mode according to claim 1, comprising:
controlling the coupling unit or the at least one DGU to bring or to keep
the value of the first voltage in a voltage range between first threshold Vtmin and a third threshold Vtmin' being greater than Vtmin by a predetermined first voltage amount δ, or
the value of the second voltage in a voltage range defined by the second threshold Vdmax and a fourth threshold Vdmax' being less than Vdmax by a predetermined second voltage amount ε;
determining the first threshold Vtmin corresponding to the value of the first voltage at the time of entry into the emergency operating mode and the second threshold Vdmax corresponding to the value of the second voltage at the time of entry into the emergency operating mode.

11. The method according to claim 10, further comprising controlling the coupling unit such that
the coupling ratio is constant if value of the first voltage is less than the first threshold Vtmin and the value of the second voltage is less than the second threshold Vdmax,
the coupling ratio is increased if the value of the second voltage is greater than the second threshold Vdmax, and
the coupling ratio is decreased if the value of the second voltage is less than the fourth threshold Vdmax' and the value of the first voltage is greater than the third threshold Vtmin' and
the coupling ratio is substantially constant otherwise.

12. The method according to claim 11, further comprising controlling the at least one DGU such that
the generation of reactive power is increased if the value of the first voltage is less than the first threshold Vtmin and the value of the second voltage is less than the second threshold Vdmax and
the generation of reactive power is substantially constant otherwise.

13. The method according to claim 12, further comprising the steps providing a sensor unit, detecting a value of the first voltage and a value of the second voltage.

14. The method according to claim 13, further comprising determining when to enter the emergency operating mode.

15. The use of the electrical power system according to claim 1 in a power supply network.

16. The method according to claim 13, wherein specific voltage values are measured by the sensor unit and communicated to the control unit to adjust all of the thresholds for performing the control of the electrical power system.

17. The electrical power system according to claim 1, wherein the first electrical power is produced in a separate location than the second electrical power.

* * * * *